(12) United States Patent
Oh

(10) Patent No.: US 10,167,592 B2
(45) Date of Patent: Jan. 1, 2019

(54) COMPOSITION FOR FIBER ADHESION AND FABRICS USING THE SAME

(71) Applicant: DOMAC LLC., Sejong (KR)

(72) Inventor: Gui Hwan Oh, Daejeon (KR)

(73) Assignee: DOMAC LLC., Sejong (KR)

( * ) Notice: Subject to any disclaimer, the term of this patent is extended or adjusted under 35 U.S.C. 154(b) by 0 days.

(21) Appl. No.: 15/547,494

(22) PCT Filed: Oct. 4, 2016

(86) PCT No.: PCT/KR2016/011071
§ 371 (c)(1),
(2) Date: Jul. 29, 2017

(87) PCT Pub. No.: WO2017/090880
PCT Pub. Date: Jun. 1, 2017

(65) Prior Publication Data
US 2018/0016736 A1    Jan. 18, 2018

(30) Foreign Application Priority Data

Nov. 24, 2015  (KR) .......................... 10-2015-0164354

(51) Int. Cl.
| | |
|---|---|
| C08K 3/22 | (2006.01) |
| C08K 5/00 | (2006.01) |
| C08K 5/13 | (2006.01) |
| C09J 11/02 | (2006.01) |
| C09J 11/04 | (2006.01) |
| C08K 5/3475 | (2006.01) |
| D06M 11/46 | (2006.01) |
| D06B 3/00 | (2006.01) |
| D06B 3/04 | (2006.01) |
| D06M 11/79 | (2006.01) |
| C08K 13/02 | (2006.01) |
| D06M 13/352 | (2006.01) |
| C09D 7/61 | (2018.01) |
| C09D 5/18 | (2006.01) |
| C09D 5/32 | (2006.01) |
| C09D 167/02 | (2006.01) |
| D06M 13/123 | (2006.01) |
| D06M 13/292 | (2006.01) |
| D06M 15/507 | (2006.01) |
| C09D 7/40 | (2018.01) |
| C09D 7/48 | (2018.01) |
| E04F 10/02 | (2006.01) |
| C08K 5/523 | (2006.01) |
| D06M 101/32 | (2006.01) |
| D01D 11/06 | (2006.01) |

(52) U.S. Cl.
CPC .......... *D06M 13/352* (2013.01); *C08K 13/02* (2013.01); *C09D 5/18* (2013.01); *C09D 5/32* (2013.01); *C09D 7/40* (2018.01); *C09D 7/48* (2018.01); *C09D 7/61* (2018.01); *C09D 167/02* (2013.01); *C09J 11/02* (2013.01); *C09J 11/04* (2013.01); *D06B 3/00* (2013.01); *D06B 3/04* (2013.01); *D06M 11/46* (2013.01); *D06M 11/79* (2013.01); *D06M 13/123* (2013.01); *D06M 13/292* (2013.01); *D06M 15/507* (2013.01); *E04F 10/02* (2013.01); *C08K 5/005* (2013.01); *C08K 5/0066* (2013.01); *D01D 11/06* (2013.01); *D06M 2101/32* (2013.01); *D06M 2200/25* (2013.01)

(58) Field of Classification Search
CPC ............. D06M 11/46; D06M 2200/25; D06M 2200/30; D06M 15/19; D06M 15/227; D06M 15/248; D06M 15/263; D06M 15/507; D06M 15/564; D02G 3/443
USPC .................................. 442/133, 136–147, 132
See application file for complete search history.

(56) References Cited

U.S. PATENT DOCUMENTS 6,150,448 A * 11/2000 Nozaki ..................... C08K 3/32
                                                                    252/606
6,689,454 B2 * 2/2004 Murschall ................. C08J 3/226
                                                                    428/328

(Continued)

FOREIGN PATENT DOCUMENTS

CN        101205324 A  *  6/2008
CN        104004292 A  *  8/2014   ............. B29C 47/92

(Continued)

OTHER PUBLICATIONS

Machine translated English language equivalent of JP-2005305778-A (2005, 12 pages).*

(Continued)

*Primary Examiner* — Brieann R Johnston
(74) *Attorney, Agent, or Firm* — STIP Law Group, LLC

(57) ABSTRACT

The present invention relates to a composition for fiber adhesion, and more particularly, a composition for fiber adhesion including titanium dioxide, flame retardants, ultraviolet absorbers and heat stabilizers; and coated yarns, fabrics and articles comprising the composition. The present invention can provide a fiber bonding composition with excellent heat shielding property, light shielding property, ultraviolet and infrared reflection characteristics, weather resistance, heat resistance, heat insulation, durability, etc. In addition, the present invention can provide a coating yarn which can be widely used for blinds, shade film, interior materials, etc. because of excellent thermal shielding property, light shielding property, ultraviolet ray and infrared ray reflection property, weather resistance, heat resistance.

5 Claims, No Drawings

(56) References Cited

U.S. PATENT DOCUMENTS

| | | | | |
|---|---|---|---|---|
| 2006/0065989 | A1* | 3/2006 | Druffel | B29C 35/0805 264/1.32 |
| 2010/0003879 | A1* | 1/2010 | Conesa | C03C 25/26 442/136 |
| 2013/0300799 | A1* | 11/2013 | Mizutani | B41J 2/16505 347/30 |

FOREIGN PATENT DOCUMENTS

| | | | |
|---|---|---|---|
| JP | 05059668 A | * | 3/1993 |
| JP | 2005305778 A | * | 11/2005 |
| JP | 2014101612 A | | 6/2014 |
| KR | 100815577 B1 | | 3/2008 |
| KR | 1020140123232 A | | 10/2014 |
| KR | 101464178 B1 | | 11/2014 |

OTHER PUBLICATIONS

Machine translated English language equivalent of JP-05059668-A (1993, 3 pages).*
Machine translated English language equivalent of CN-104004292-A (2014, 4 pages).*
Machine translated English language equivalent of CN-101205324-A (2008, 9 pages).*
International Search Report of PCT/KR2016/011071, dated Jan. 6, 2017, English Translation.

* cited by examiner

COMPOSITION FOR FIBER ADHESION AND FABRICS USING THE SAME

CROSS-REFERENCE TO RELATED APPLICATIONS

This application is the U.S. National Phase under 35 U.S.C. § 371 of International Application No. PCT/KR2016/011071 filed on Oct. 4, 2016, which in turn claims the benefit of Korean Application No. 10-2015-0164354, filed on Nov. 24, 2015, the disclosures of which are incorporated by reference into the present application.

TECHNICAL FIELD

The present invention relates to a composition for fiber adhesion, and more particularly, a composition for fiber adhesion including titanium dioxide, flame retardants, ultraviolet absorbers and heat stabilizers; and coated yarns, fabrics and articles comprising the composition.

BACKGROUND ART

Materials for blinds, sunscreens, wallpaper, floor coverings of buildings and automotive interiors include paper, vinyl, fabric, plastic, and ceramics.

However, fabrics or textiles are widely used in terms of heat shielding, light shielding, weatherability, heat resistance, flame retardance, processability, and the like.

In order to use fabrics for blinds, light-shields, wallpaper, flooring, automotive interiors, the adhesive layer must be coated on the fabric. In this case, because the coating layer cannot be uniformly formed, the coating layer can easily be peeled off and the manufacturing process becomes complicated.

Particularly, in the fabric for the blind and the light shielding film, fabrics excellent in heat shielding, light shielding, ultraviolet and infrared reflection characteristics, weather resistance and heat resistance must be used to conserve energy by lowering indoor temperatures and reducing cooling costs. However, this cannot be achieved by the method of coating the fabric.

In order to solve such a problem, Korean Patent No. 10-0815577B1 shows a multi-layer fabric, wherein the fabric comprises a surface layer, a backside layer, and the intermediate layer which is composed of a first intermediate layer and a second intermediate layer.

Korean Patent Publication No. 10-2014-0123232A discloses a blind paper manufactured by the method comprising the step forming an adhesive (21) on the surface of a wallpaper (20), the step forming the fiber yarn joined wallpaper (20) by joining at equal intervals fiber yarns (30) and drying, the step forming double-walled wallpaper (400) by double bonding fiber yarn spliced wallpaper (20) with a bonding agent, the step coating a curable resin (620) on the double-walled wallpaper (400), and the step cutting the cured double-junction wallpaper (400).

Meanwhile, Korean Patent No. 10-1464178B1 discloses a blind sheet manufactured by the method comprising the step forming a coating layer (2) on the surface of the polyester fabric (1) and the step contacting the hot press forming roller (3) on the surface of the fabric. The coating layer includes an acrylic resin coating, polyurethane resin coating and PCV resin coating, and a thickness of coating layer is 0.1 to 0.8 mm.

However, the fabrics disclosed in above documents cannot be used stably for a long period of time for blind, sunscreen, interior, and the like, because heat shielding, light shielding, ultraviolet and infrared reflection, weather resistance, heat resistance, heat insulation, durability, etc. of the fabrics are poor.

DISCLOSURE

Technical Problem

The present invention has been made to solve the above problems of the prior art, and an object of the present invention is to provide a fiber bonding composition with excellent heat shielding property, light shielding property, ultraviolet and infrared reflection characteristics, weather resistance, heat resistance, heat insulation, durability, etc.

In addition, the present invention is to provide a coating yarn which can be widely used for blinds, shade film, interior materials, etc. because of excellent thermal shielding property, light shielding property, ultraviolet ray and infrared ray reflection property, weather resistance, heat resistance.

Furthermore, the present invention is to provide a fabric for blind, sunscreen or interiors where it is possible to implement various colors because the fabric is a white color, and the energy can be dramatically reduced because the fabric lowers the indoor temperature and reduces the cooling.

Technical Solution

In order to achieve the above object, the present invention provides a fiber adhesion composition comprising a thermoplastic resin, a titanium dioxide, a flame retardant, an ultraviolet absorber, and a heat stabilizer.

In one embodiment of the present invention, the composition comprises 100 parts by weight of the thermoplastic resin, 5 to 30 parts by weight of titanium dioxide, 1 to 10 parts by weight of a flame retardant, 1 to 10 parts by weight of an ultraviolet absorber and 1 to 10 parts by weight of a heat stabilizer.

In one embodiment of the present invention, the composition further comprises 1 to 10 parts by weight of sodium silicate, 1 to 10 parts by weight of potassium silicate, 1 to 10 parts by weight of a spherical ceramic powder containing a hollow and 1 to 5 parts by weight of an alkali compound.

In one embodiment of the present invention, the titanium dioxide is treated with an amino group-containing silane coupling agent and an epoxy group-containing silane coupling agent.

In one embodiment of the present invention, the composition comprises further 1 to 10 parts by weight of a silane coupling agent.

The present invention also relates to a coated yarn comprising yarns selected from polyolefin fiber, a polyester fiber, a nylon fiber, polyvinyl chloride fiber, polyurethane fiber, glass fiber and carbon fiber; and a coating layer, which comprises the fiber adhesion composition, coated on the yarns.

In addition, the present invention provides a fabric manufactured by weaving the coated yarn, wherein the fabric has a solar reflectance of 70% or more, a visible light reflectance of 80% or more, a solar transmittance of 15% or less, a visible light transmittance of 10% or less and a UV transmittance of 5% or less.

The present invention also relates to an article comprising the fabric, wherein the article is a blind or a light-shielding film.

Advantageous Effects

The present invention can provide a fiber bonding composition with excellent heat shielding property, light shielding property, ultraviolet and infrared reflection characteristics, weather resistance, heat resistance, heat insulation, durability, etc.

In addition, the present invention can provide a coating yarn which can be widely used for blinds, shade film, interior materials, etc. because of excellent thermal shielding property, light shielding property, ultraviolet ray and infrared ray reflection property, weather resistance, heat resistance.

Furthermore, the present invention can provide a fabric for blind, sunscreen or interiors where it is possible to implement various colors because the fabric is a white color, and the energy can be dramatically reduced because the fabric lowers the indoor temperature and reduces the cooling.

BEST MODEL

Hereinafter, the present invention will be described in detail based on examples. The term and example in the present invention is used to describe the invention more specifically and the scope of the present invention is not limited thereto.

Technical terms and scientific terms used in the present invention, unless otherwise defined, indicates the meaning well known to those of ordinary skill in the art.

The present invention relates to a fiber adhesion composition comprising a thermoplastic resin, titanium dioxide, a flame retardant, an ultraviolet absorber and a heat stabilizer.

The composition may include 100 parts by weight of the thermoplastic resin, 5 to 30 parts by weight of titanium dioxide, 1 to 10 parts by weight of a flame retardant, 1 to 10 parts by weight of an ultraviolet absorber and 1 to 10 parts by weight of a heat stabilizer.

Examples of the thermoplastic resin include polyolefin, polyester, nylon, polyvinyl chloride, polyurethane, acrylic resin and the like. And they can be used without limitation, and polyester and nylon are particularly preferred.

The titanium dioxide has thermal barrier properties, light shielding properties, ultraviolet and infrared reflection characteristics. The titanium dioxide is used in an amount of 5 to 30 parts by weight per 100 parts by weight of the thermoplastic resin.

When the content is less than 5 parts by weight, the light barrier property and the ultraviolet and infrared ray reflection characteristics are deteriorated, and when it exceeds 30 parts by weight, the adhesion property and workability are rather lowered.

The surface of titanium dioxide can be treated with a silane coupling agent. Silane coupling agent has an organic functional group which can react with an organic compound and a hydrolytic group which can react with an inorganic compound. The silane coupling agent can improve adhesion, heat shielding, light shielding property and durability of the coated yarn through the improvement of the interfacial adhesion between yarn, thermoplastic resin and titanium dioxide.

Examples of the silane coupling agent include an alkyl group-containing silane, an amino group-containing silane, an epoxy group-containing silane, an acryl group-containing silane, an isocyanate group-containing silane, a mercapto group-containing silane, a fluorine group-containing silane, and vinyl group-containing silane.

The amount of the silane coupling agent to be surface-treated is preferably 1 to 10 parts by weight per 100 parts by weight of titanium dioxide. When the content is less than 1 part by weight, it is difficult to expect the improvement of adhesion, and if it exceeds 10 parts by weight, the interface adhesion property and light shielding property are lowered by use of excessive silane coupling agent.

The titanium dioxide is preferably treated with a mixture of an amino group-containing silane coupling agent and an epoxy group-containing silane coupling agent.

The flame retardant is used to provide flame retardance or non-flammability to the composition, and phosphorus flame retardants such as triphenyl phosphate and the like, a metal hydroxide flame retardant such as aluminum hydroxide, magnesium hydroxide and the like, a nitrogen-containing compound-based flame retardant, a graphite material-based flame retardant, a melamine cyanurate flame retardant, a metal oxide flame retardant such as antimony oxide, phosphate-based flame retardant and the like can be used without limitation.

The content of the flame retardant is 1 to 10 parts by weight based on 100 parts by weight of the thermoplastic resin. When the content is less than 1 part by weight, the flame retardance is lowered, and when the content exceed 10 parts by weight, the adhesion and workability are rather lowered.

The ultraviolet absorber absorbs ultraviolet rays of the sunlight to increase heat shielding and light shielding, and benzotriazole, hydroxybenzophenone, hydroxyphenyltriazine, and the like can be used without limitation. The content of the ultraviolet absorber is 1 to 10 parts by weight per 100 parts by weight of the thermoplastic resin. When the content is less than 1 part by weight, heat shielding and light shielding properties are lowered. If it exceeds 10 parts by weight, the mechanical properties and workability are rather lowered.

The heat stabilizer is used for improving weather resistance, heat resistance, heat insulation and durability. Phenol antioxidants, alkylated monophenols, alkylthiomethyl phenols, hydroquinones, alkylated hydroquinone, hydroxybenzyl, triazine, and the like can be used without limitation.

The content of the heat stabilizer is 1 to 10 parts by weight based on 100 parts by weight of the thermoplastic resin. When the content is less than 1 part by weight, the weather resistance, heat resistance and durability are lowered. If it exceeds 10 parts by weight, the mechanical properties and workability are rather lowered.

The composition of the present invention can further comprise sodium silicate, potassium silicate, a spherical ceramic powder and an alkaline compound.

The composition comprises 1 to 10 parts by weight of sodium silicate, 1 to 10 parts by weight of potassium silicate, 1 to 10 parts by weight of a spherical ceramic powder and 1 to 5 parts by weight of the alkali compound based on 100 parts by weight of the thermoplastic resin.

The sodium silicate is used for imparting flame retardance, adhesiveness and fusibility, and solid phase or a solution can be used.

The content of sodium silicate is 1 to 10 parts by weight based on 100 parts by weight of the thermoplastic resin. When the content is less than 1 part by weight, adhesion and fusibility in coating with yarn are lowered. If it exceeds 10 parts by weight, flame retardance and workability are lowered.

Potassium silicate is excellent in adhesiveness, so that the compatibility of the composition, the adhesiveness to the raw material and the flame retardance can be improved. The content of potassium silicate is 1 to 10 parts by weight based on 100 parts by weight of the thermoplastic resin. If the content is less than 1 part by weight, the fusibility with the raw material is lowered. When it exceeds 10 parts by weight, miscibility of the composition is lowered and a uniform coating layer cannot be formed.

The spherical ceramic powder includes a hollow in a vacuum state in inner region, and the diameter of powder is 1~50 μm and the main component of powder is aluminosilicate.

Since the spherical ceramic powder has a smooth spherical surface, the surface area and the contact area between the particles is low, so that the thermal conductivity is low. Since the surface is smooth, the reflection properties are improved and heat shielding, light shielding and heat insulating property can be improved.

In addition, a hollow in a vacuum state lowers the thermal conductivity, and plays a role of dramatically improving the flame retardance and heat insulation and lowering the movement of sound waves.

The content of the spherical ceramic powder is preferably 1 to 10 parts by weight per 100 parts by weight of the thermoplastic resin. When the content is less than 1 part by weight, it is difficult to expect shading and heat insulation effect, and when it exceeds 10 parts by weight, workability and adhesiveness is lowered.

The diameter of the ceramic powder is preferably 1 to 50 μm. When the diameter is less than 1 μm, the flame retardance, the heat insulation property and the reflection efficiency are lowered. If it exceeds 50 μm, the uniformity and workability of the coating layer is lowered.

The spherical ceramic powder may be surface-treated with a silane coupling agent. The interface property between the powder and other components can be improved. The content of the silane coupling agent coated on the surface of the ceramic powder is 1 to 10 parts by weight relative to 100 parts by weight of ceramic powder. When the content is less than 1 part, it is difficult to expect an improvement in adhesion, and when it exceeds 10 parts by weight, excessive silane coupling agent deteriorates interfacial adhesion properties and light shielding properties.

The alkali compound loosens the structure of the fiber molecule, and can efficiently bind the composition to surface of yarn. The alkali compound includes sodium hydroxide, potassium hydroxide, sodium carbonate, potassium carbonate, sodium hydrogen carbonate and potassium hydrogen carbonate.

The content of the alkaline compound is 1 to 5 parts by weight based on 100 parts by weight of the thermoplastic resin. When the content is less than 1 part by weight, the effect is insignificant, and when it exceeds 5 parts by weight, the fiber surface is damaged, and the heat insulation, light shielding property, heat resistance, durability, etc. are lowered.

The composition of the present invention may further comprise 1 to 10 parts by weight of a silane coupling agent.

The content of the silane coupling agent is preferably 1 to 10 parts by weight. When the content is less than 1 part, it is difficult to expect an improvement in the adhesion. If it exceeds 10 parts by weight, the excessive use of a silane coupling agent lowers interfacial adhesion properties and thermal barrier properties.

The composition of the present invention further comprises a silane coupling agent oligomer. The silane coupling agent oligomer can be made by reaction of an amino group-containing silane coupling agent and an epoxy group-containing silane coupling agent. By using the silane coupling agent oligomer, workability in forming a coating layer can be improved and the thickness of the produced coating layer can be uniformly controlled.

The molecular weight of the silane coupling agent oligomer is preferably 1,000 to 5,000 g/mol. The content of a silane coupling agent oligomer is 1 to 5 parts by weight based on 100 parts by weight of thermoplastic resin. When the content is less than 1 part by weight, the effect is insignificant, and if it exceeds 5 parts by weight, the workability is lowered and the thickness of the coating layer becomes uneven.

The composition may further comprise an acrylic emulsion. The acrylic emulsion improves adhesive property and elasticity, and the acrylic resin includes polymethylmethacrylate, polyethylmethacrylate, polymethylacrylate, polyethylacrylate, acrylic copolymer and the like.

The content of the acrylic emulsion is 1 to 5 parts by weight based on 100 parts by weight of the thermoplastic resin. When the content is less than 1 part by weight, sufficient adhesion and elasticity can be exhibited. If it exceeds 5 parts by weight, the strength is rather lowered.

The composition of the present invention may comprise an antimicrobial agent, a plasticizer, a lubricant, a defoaming agent, a thickener, a catalyst, a diluent, dispersing agents, leveling agents, crosslinking agents, pH adjusting agents, pigments, wetting agents, antioxidants, antistatic agents, a release agent, and the like.

The present invention also relates to a coated yarn comprising a yarn selected from a polyolefin fiber, a polyester fiber, a nylon fiber, a polyvinyl chloride fiber, a polyurethane fiber, a glass fiber and a carbon fiber; and a coating layer, which comprises the fiber adhesion composition, coated on the yarn.

As raw materials for the core of the coated yarn, polyolefin fibers, polyester fibers, nylon fiber, polyvinyl chloride fiber, polyurethane fiber, glass fiber, carbon fiber, etc. can be used without limitation.

The diameter of the yarn is 50 to 4,000 denier, and the thickness of the coating layer coated on the yarn is 15 to 1,000 μm.

The yarn is passed through a die nozzle of an extruder and the composition for fiber bonding is applied to a yarn. Coating yarn can be produced by coating the composition on yarn with a certain thickness and winding.

In addition, the present invention provides a fabric manufactured by weaving the coated yarn. The fabric has a solar reflectance of 70% or more, a visible light reflectance of 80% or more, a solar light transmittance of 15% or less, a visible light transmittance of 10% or less and a UV transmittance of 5% or less.

The fabric with a reflectance and a transmittance satisfying the above-described numerical value range is used as a blind and a light-blocking film. The fabric can save energy remarkably through reducing the cooling cost by lowering the room temperature of the building.

By weaving the coated yarn into warp and weft yarns, plain weaves, twill weaves, etc. can be manufactured.

The invention also relates to an article comprising the fabric, which is a blind or a light-shielding film.

The fabrics are characterized by heat shielding, light shielding, ultraviolet and infrared reflection characteristics, weather resistance, heat resistance, and they can be widely used for blinds, light-shielding films, and interior materials.

Since the fabric is basically white, various colors can be realized. Especially, the color of the fabric can be adjusted by adding additives or pigments with various colors.

By using the fabric as a material for a blind and a light-shielding film, the energy can be saved by lowering cooling costs and reducing the temperature of building.

DESCRIPTION OF THE INVENTION

Hereinafter, the present invention will be described in detail with reference to Examples and Comparative Examples. The following examples are illustrated only for the purpose of carrying out the invention, but the present invention is not limited thereto.

EXAMPLE 1

100 parts by weight of a polybutyleneterephthalate resin, 15 parts by weight of titanium dioxide, 5 parts by weight of triphenyl phosphate, 5 parts by weight of benzotriazole, and 3 parts by weight of hydroquinone were mixed to prepare a composition for fiber bonding.

A polyethyleneterephthalate yarn was passed through a die nozzle of an extruder.

The composition for fiber bonding was coated on a yarn to a thickness of 50 μm and wound.

The coated yarn was woven in plain weave using warp and weft yarns to produce a fabric.

EXAMPLE 2

By the same method as in Example 1 except that 3 parts by weight of titanium dioxide was used, fabrics were prepared.

EXAMPLE 3

The same procedures as in Example 1 were carried out except that 50 parts by weight of titanium dioxide was used, fabrics were prepared.

EXAMPLE 4

The procedure of Example 1 was repeated except that the surface-treated titanium dioxide was used. The titanium dioxide was treated with 3-aminopropyltrimethoxysilane and 3-glycidoxypropyltrimethoxysilane.

EXAMPLE 5

A fabric was prepared in the same manner as in Example 1 except that 5 parts by weight of sodium silicate, 5 parts by weight of potassium silicate, 5 parts by weight of spherical ceramic powder and 3 parts by weight of sodium hydroxide were further added.

EXAMPLE 6

A fabric was prepared in the same manner as in Example 1 except that 5 parts by weight of 3-aminopropyltrimethoxysilane was additionally used.

EXAMPLE 7

100 parts by weight of 3-aminopropyltrimethoxysilane and 100 parts by weight of 3-glycidoxypropyltrimethoxysilane were reacted at 60° C. for 24 hours to produce a silane coupling agent oligomer having a molecular weight of 4,000 g/mol.

A fabric was prepared in the same manner as in Example 1 except that 3 parts by weight of the silane coupling agent oligomer was additionally used

COMPARATIVE EXAMPLE 1

Fabrics were prepared in the same manner as in Example 1 except that titanium dioxide was not used.

The properties of the fabrics prepared from the above Examples and Comparative Examples were measured, and the results are shown in Table 1 below.

The reflectance and transmittance of the fabric were measured according to ASTM E 903-12.

TABLE 1

|  | Example | | | | | | | Comparative Example |
|---|---|---|---|---|---|---|---|---|
|  | 1 | 2 | 3 | 4 | 5 | 6 | 7 | 1 |
| Solar reflectance (%) | 72.3 | 68.1 | 68.4 | 75.8 | 73.9 | 76.3 | 74.1 | 58.6 |
| Visible light reflectance (%) | 81.8 | 78.3 | 79.4 | 86.4 | 83.5 | 85.9 | 83.6 | 64.4 |
| Solar transmittance (%) | 13.1 | 14.5 | 15.3 | 8.9 | 9.5 | 9.1 | 10.9 | 20.6 |
| Visible light transmittance (%) | 7.8 | 8.5 | 8.8 | 5.5 | 6.5 | 6.1 | 7.6 | 16.9 |
| UV transmittance (%) | 4.5 | 4.6 | 4.6 | 3.4 | 3.8 | 3.6 | 4.1 | 6.0 |

From the results in the above Table 1, it can be seen that the fabrics of Examples 1 to 7 exhibit excellent heat shielding, light shielding, UV and infrared ray reflection property, heat insulation, etc., and are widely used for blinds, the light shielding film, interiors, etc.

On the other hand, the fabric of Comparative Example 1 shows low heat shielding, light shielding, UV and infrared ray reflection property compared with Examples.

INDUSTRIAL AVAILABILITY

Since the fabric of present invention is a white color, it is possible to provide a fabric with variety of colors.

The present invention can provide a fabric for blind, sunscreen or interiors where the energy can be dramatically reduced because the fabric lowers the indoor temperature and reduces the cooling.

The invention claimed is:

1. A fiber adhesion composition comprising a thermoplastic resin, a titanium dioxide, a flame retardant, an ultraviolet absorber, a heat stabilizer, a sodium silicate, a potassium silicate, a spherical ceramic powder, an alkali compound, a silane coupling agent, and a silane coupling agent oligomer, wherein the composition comprises 100 parts by weight of the thermoplastic resin, 5 to 30 parts by weight of titanium dioxide, 1 to 10 parts by weight of a flame retardant, 1 to 10 parts by weight of an ultraviolet absorber, 1 to 10 parts by weight of a heat stabilizer, 1 to 10 parts by weight of a sodium silicate, 1 to 10 parts by weight of a potassium silicate, 1 to 10 parts by weight of a spherical ceramic powder, 1 to 5 parts by weight of an alkali compound, 1 to 10 parts by weight of a silane coupling agent, and 1 to 5 parts by weight of a silane coupling agent oligomer.

2. The composition according to claim 1, wherein the titanium dioxide is treated with an amino group-containing silane coupling agent and an epoxy group-containing silane coupling agent.

3. A coated yarn comprising a yarn selected from polyolefin fiber, polyester fiber, nylon fiber, polyvinyl chloride fiber, polyurethane fiber, glass fiber or carbon fiber; and a coating layer, which comprises the fiber adhesion composition according to claim 1, coated on the yarn.

4. A fabric manufactured by weaving a coated yarn comprising a yarn selected from polyolefin fiber, polyester fiber, nylon fiber, polyvinyl chloride fiber, polyurethane fiber, glass fiber or carbon fiber; and a coating layer, which comprises a fiber adhesion composition, the fiber adhesion composition comprising a thermoplastic resin, a titanium dioxide, a flame retardant, an ultraviolet absorber, and a heat stabilizer, wherein the fabric has a solar reflectance of 70% or more, a visible light reflectance of 80% or more, a solar transmittance of 15% or less, a visible light transmittance of 10% or less and a UV transmittance of 5% or less.

5. An article comprising a fabric manufactured by weaving a coated yarn comprising a yarn selected from polyolefin fiber, polyester fiber, nylon fiber, polyvinyl chloride fiber, polyurethane fiber, glass fiber or carbon fiber; and a coating layer, which comprises a fiber adhesion composition, the fiber adhesion composition comprising a thermoplastic resin, a titanium dioxide, a flame retardant, an ultraviolet absorber, and a heat stabilizer, wherein the fabric has a solar reflectance of 70% or more, a visible light reflectance of 80% or more, a solar transmittance of 15% or less, a visible light transmittance of 10% or less and a UV transmittance of 5% or less, wherein the article is a blind or light-shielding film.

* * * * *